US005585964A

United States Patent [19]

Schalz

[11] Patent Number: 5,585,964

[45] Date of Patent: Dec. 17, 1996

[54] MODULAR MICROSCOPE SYSTEM

[75] Inventor: Karl-Josef Schalz, Weilburg, Germany

[73] Assignee: Leica Mikroskopie und Systeme GmbH, Wetzlar, Germany

[21] Appl. No.: 397,122

[22] Filed: Mar. 9, 1995

[30] Foreign Application Priority Data

Sep. 19, 1992 [DE] Germany .......................... 42 31 470.4

[51] Int. Cl.⁶ .................................................. G02B 21/00
[52] U.S. Cl. ......................... 359/368; 359/381; 359/821
[58] Field of Search .................................. 359/368, 819, 359/371, 821, 381, 827, 385, 387, 389

[56] References Cited

U.S. PATENT DOCUMENTS

| 4,619,503 | 10/1986 | Reinheimer et al. ................ | 350/511 |
| 5,089,909 | 2/1992 | Kleinberg ........................... | 359/387 |
| 5,091,793 | 2/1992 | Goto et al. ......................... | 359/819 |

FOREIGN PATENT DOCUMENTS

| 3230504 | 3/1983 | Germany . |
| 1164241 | 9/1969 | United Kingdom . |

OTHER PUBLICATIONS

504 Zeiss Information, 29 (1987) Jul. No. 98, pp. 4–8, Oberkochen, W. Germany.

Primary Examiner—Timothy P. Callahan
Assistant Examiner—Jeffrey Zweizig
Attorney, Agent, or Firm—Bean, Kauffman & Spencer

[57] ABSTRACT

A modular microscope system includes a plurality of stackable housing modules each having a plurality of inwardly pointing protuberances provided with one or more precision stop surfaces thereon for removably mounting and positioning a plurality of prealigned functional element carriers having corresponding precision stop surfaces thereon for engagement with the precision stop surfaces of the housing module protuberances.

26 Claims, 3 Drawing Sheets

MODULAR MICROSCOPE SYSTEM

BACKGROUND OF THE INVENTION

1. Field of the Invention

The invention pertains to a modular microscope system, with an assembled microscope basic unit, which has a stand-foot, a stand upper part, and an intermediate module with an attachable binocular housing.

2. Prior Art

A microscope is already known from DE 30 37 556 A1, with a basic frame, in the vertical part of which dovetail-guides are superposed, so that drawer-shaped modules can be linked into them. The dovetail-guides, which are referred to as gliding-guides, are continuously formed at the inner wall of the housing. They require a high amount of manufacturing precision throughout the entire sliding length of each module. Because these gliding-guides are recesses in the inner wall area of the vertical stand carrier-part, which is designed in a compact construction type, manufacturing problems occur in the precise production of many superposed-layered parallel dovetail-guides. Heat influences have a negative impact as well, since larger temperature intervals may lead to pressure loads or tensile loads respectively between the inner wall of the housing on the one hand and the slide-in module on the other hand, which finally results in a more or less cumbersomely moving drawer-guide.

Furthermore, a chassis for optical devices is known from EP 90 967 B1, which is designed as a 3-dimensional distortion-stiff hollow structure, which may be assembled of several parts and for which extended aluminum oxide is the recommended material. In this, the individual housing parts may be "trimmed on", i.e., sintered together or they may be detachably connected with each other, e.g. screwed connections with a tie rod. In the case of sintered groups of parts a quick exchange of individual basic-unit-parts is not possible. In case the parts of the ceramic-chassis are connected through screws or other anchoring means, problems occur due to the different choices of materials (on the one hand ceramic, on the other hand, metal screws or metal rods respectively). It is also technically not entirely possible to produce basic-unit housings from ceramic materials with the required narrow tolerances for precision microscopes. An additional disadvantage is the susceptibility to damage or wear respectively for modularly-designed parts made from ceramics (i.e., especially parts intended for a fast exchange).

SUMMARY OF THE INVENTION

It is thus the task of the proposed invention to design a microscope system of the type described above, in which a modular microscope system is described under consideration of ergonomic aspects and the utilization of modern manufacturing processes, in which a system-integrated up and down rating of the individual system parts is possible, whereby the height of the eyepiece remains constant for the observer.

The task is solved in the proposed invention by forming the basic-unit as a frame-construction-type in several parts. Moreover it contains precision-stop-surfaces for the exactly-aligned positioning and mounting of carriers, on which optical and/or electronic pre-aligned and completely-assembled individual parts or groups of parts, which are gathered into functional units, are arranged. The precision-stop surfaces may be shaped especially as small-dimensional plane contact surfaces or bearing surfaces respectively, which correspond regarding their arrangement in the plane or the space of the housing to the surface or spatial dimensions respectively of the carrier, which can be placed in the correct position. It is moreover also possible that the precision-stop-surfaces are not shaped as plane contact or bearing surfaces respectively, or as point contact or point bearing surfaces respectively. In an especially advantageous design type, at least one one-piece combination-stop-surface system is intended for the exact positioning of a carrier. It contains at least two precision-stop-surfaces, which are located in defined spatial arrangement—preferably in levels vertically aligned towards each other. The above mentioned precision-stop-surfaces may, e.g., be arranged on cylindrical or truncated-cone-shaped housing protuberances, which hang like stalactites from the inner ceiling wall of a basic-unit part. It is also possible that the precision-stop-surfaces are arranged on cylindrical or truncated cone-shaped housing-protuberances, which reach up from the inner floor-wall of the basic-unit part.

In a further design type of the proposed invention, the housing protuberances which carry the stop-surfaces may be partially contained along their longitudinal extent by the side walls of the basic-unit parts or may spatially merge with them respectively. In addition, it is possible that plane and/or angular wall-shaped housing-inner-space dividers are intended for the inner space of the basic-unit parts, which may possibly contain precision-stop-surfaces. For this the stop-surfaces can be designed in such a way that they are located only on a raised partial-area of the housing-inner-space-divider. The arrangement in the proposed invention may be such that some of the protuberances or housing inner-space-dividers respectively which contain the bearing contacts, have bore holes along their longitudinal extent, which correspond to respective clearances, e.g. holes, half-holes, long holes, slits and indents in or on the carriers respectively.

The carriers may be shaped basically two-dimensional, e.g., as a platform, plate or slider for the attachment or insertion to or into one of the partial systems of the microscope's basic unit. It is, however also possible that the carriers are shaped as three-dimensional housing-parts, e.g. as a pipe, block, cube, prism, or as a parallelepiped or angular chassis-part for the attachment or insertion or sliding to or into at least one of the partial systems of the microscope's basic unit.

For a further design type of the proposed invention, at least one holding-element is additionally intended, which reaches at least partially around the carrier in due form, whereby corresponding precision-stop-surfaces are also intended for the exact positioning of the holding element. The carrier may also be shaped as a slide-in-module, in which several filters are arranged consecutively along its optical axis, which may be brought into operating position individually if chosen with corresponding filter-slides. The carrier may also be shaped as an angular holding-element for the microscope-table, whereby the holding or guide respectively contain precision stop and guide surfaces in the vertical area of the upper part of the stand for a smooth-working vertical shifting (z-direction).

It is possible that the carrier contains not only optical parts like mirrors, lenses and stops but also a completely assembled turret-installation, which in turn contains pre-aligned and completely assembled parts of the same type but of different optophysical function, e.g. fluorescence-dividing cubes. The carrier may also be shaped as a slide-in module, in which several stops are arranged along its optical axis, e.g. location fixed or location variable fixed-stops or form variable stops. These may be brought into operating position through a designated controlling device and in a given case be adjusted according to their size. It is also possible that an intermediate-module, containing a tube lens is provided, which can be attached to the collar horizontal part of the upper precision-stop-surfaces. This may then be exchanged in such a way for another intermediate-module, containing not only a tube-lens but also a controllable and prealigned Bertrand lens, that the height of the eyepiece of the entire microscope system remains unchanged. A further intermediate-module is characterized by containing additionally a discontinuous enlargement-changer or a zooming system or a polarizing-arrangement respectively.

BRIEF DESCRIPTION OF THE DRAWING

The invention is described by the figures below in more detail. They show.

DESCRIPTION OF THE PREFERRED EMBODIMENTS

Figure 1A:
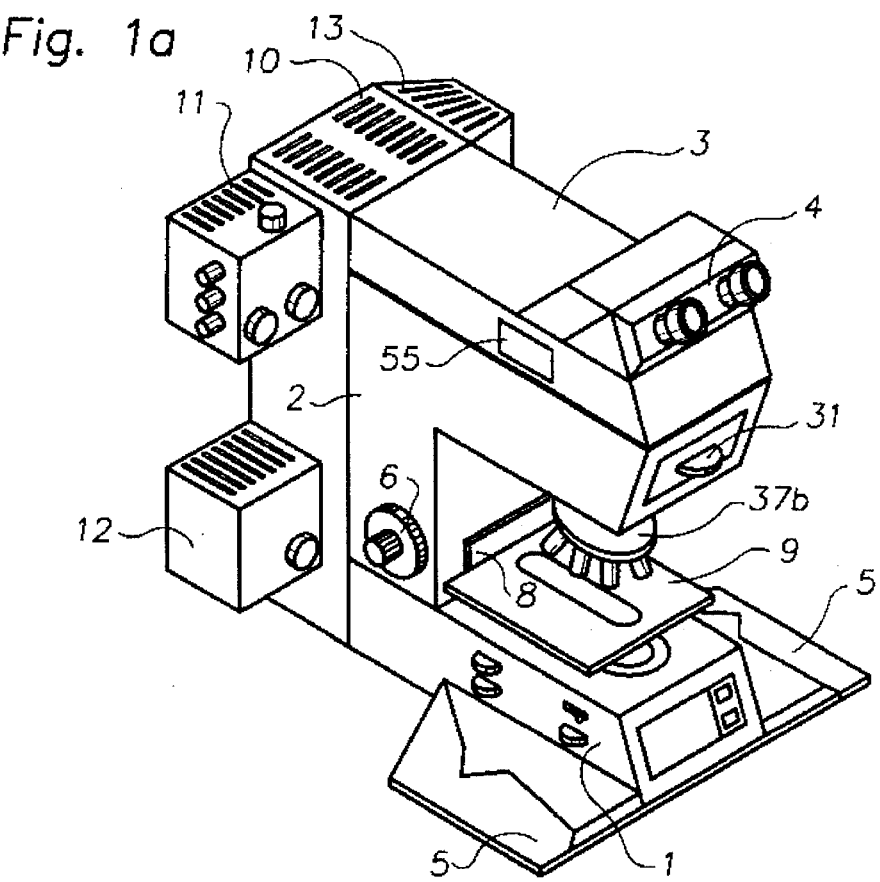
FIG. 1a: a perspective view of a modular microscope system as proposed by this invention.
Figure 1B:
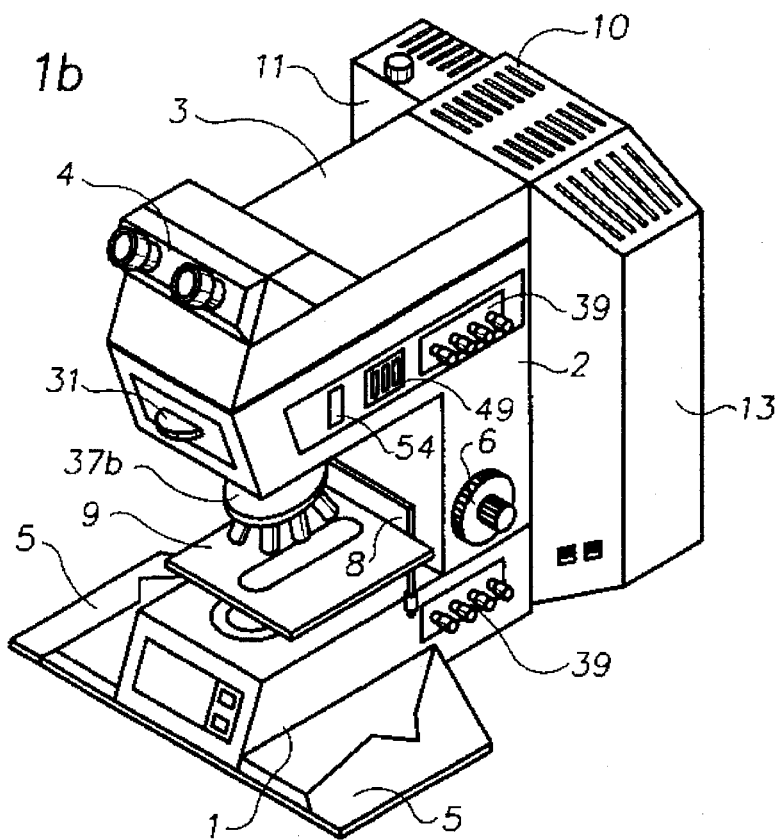
FIG. 1b: a perspective depiction of the system depicted in FIG. 1a from a different view with an additional housing module.

FIGS. 1a and 1b respectively depict a modular microscope system with a microscope basic unit, which consists of a stand-foot (1), the upper part of a stand (2) and an intermediate-module (3), with an attachable or mountable binocular-housing (4). The stand-foot (1) merges with the observer facing part into an ergonomical, flat tooth rest (5), which is mounted on both sides. The upper part of the stand (2) has a vertical part. Manual operating devices (6) are provided on or in its side areas, which direct the movement or controlling processes. A precision-guide for a table-angle (8), which is detachably linked to the microscope-table (9), is intended for the vertical part of the upper part of the stand (2), which faces the observer.

A mirror-housing (10) is adapted in that area of the vertical-part of the intermediate-module (3), as well as the upper part of the stand (2), which points away from the observer. Lamp housings (11,12) on the one hand and an additional housing-module on the other hand are coordinated to this mirror-housing (10). The additional housing-module contains among others the electrical or the electronic respectively provider and controlling installations for the entire system (cf. FIG. 1b).

The modular construction-alignment and assembly-principle proposed by this invention is described below in further detail with special reference to FIGS. 3a to 3d in connection with FIGS. 2a and 4a to 4c.

Figure 3A:
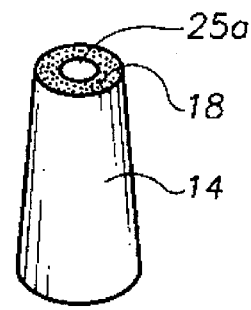
FIGS. 3a–3c: conical housing protuberances with precision-stop-surfaces.
Figure 3B:
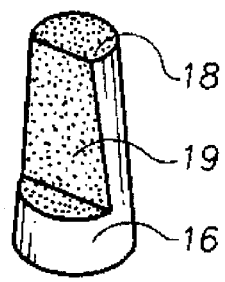
Figure 3C:
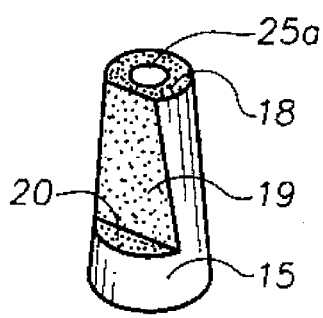
Figure 3D:
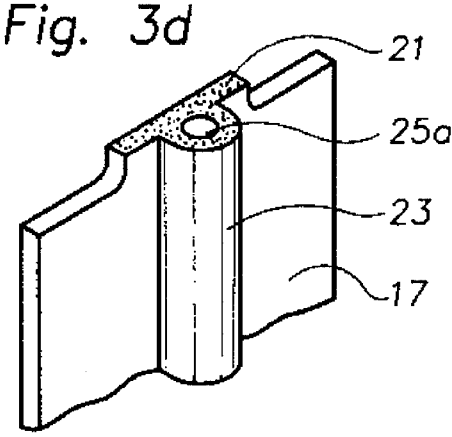
FIG. 3d: a wall-shaped housing-inner-space-divider with precision-stop-surfaces.

In order to increase the rigidity of the frame-constructions for complex assembled, modularly designed optical precision equipment, especially microscopes and to proceed at the same time in a flexible manufacturing and material saving process and a service and assembly-friendly construction concept, the individual microscope-basic-unit-modules such as stand-foot (1), upper part of the stand (2) and intermediate-module (3) are manufactured in a one-piece construction-type. They can be produced e.g. in aluminum or brass in a single manufacturing process, whereby partition walls or transverse fins or posts or angles or stakes respectively are made for the respective inner spaces of these basic-unit-modules together with the actual housing-module. In this application they are generally referred to as inward-pointing housing protuberances. It is significant here that the positioning and final dimensions of these protuberances need not yet comply to the final required precision. The truncated cone-shaped protuberances (14–16) depicted in FIGS. 3a to 3c or the wall-shaped housing-inner-spaces-divider (17) depicted in FIG. 3d are subject to a mechanical precision-final treatment in a further processing phase, in which they receive preferably plane precision-stop-surfaces (18–20), which correspond to the respectively precise manufactured counter-surfaces of the carriers. The protuberances may also contain several precision-stop-surfaces, as is e.g. shown in FIGS. 3b or 3c respectively.

The longitudinal extent of the truncated cone-shaped protuberances should, due to static construction reasons preferably point in the direction of gravity, whereby, it is of little importance whether they are formed like stalactites at the inner upper ceiling wall of a horizontal housing-part or whether they are positioned on the inner base surface of the horizontal basic-unit part in stalagmite-shaped columns or posts or stakes respectively. It is however also possible to have elements (23) shaped into the inner vertical walls of the horizontal basic-unit-part, compare FIG. 4a, which merge as cylindrical or truncated-cone-shaped elements alongside their longitudinal side partially with the vertical inner-wall and which narrow-down downwards, i.e., in the direction of the stand-foot (1). As can be seen directly in FIGS. 4b or 4c respectively, the carrier depicted there (24) shows corresponding flange-surfaces in or on the side, facing the upper part of the stand (2), which correspond to the stop-surfaces (22).

Although a 3-point contact is due to reasons of construction sufficient for the exactly-aligned positioning of essentially two-dimensional carriers (24), it may be useful for large-surface dimensions to produce a 4-point contact or a larger number multi-point contact. In either case a discontinuous contacting of modules, module-parts or carriers (24) respectively occurs. This marks an essential difference to conventional dovetail-guides, which have to have continuous longitudinal-guides in the sliding-direction, which leads to the disadvantages described above.

Figure 4B:
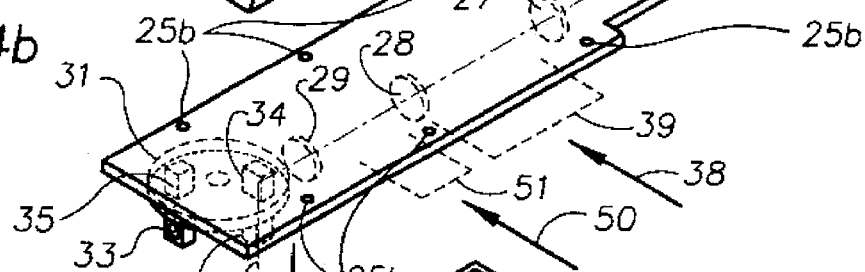
FIG. 4b: a two-dimensional carrier with pre-aligned parts as proposed by this invention.

The carrier (24) in FIG. 4b has individual parts, e.g. a surface mirror (26), lenses (27–29) as well as—in a given case—additional parts which are beam-deflecting, beam-manipulating or change the diameter of the beam respectively. It is of special significance for the proposed invention that all of the parts on the carrier (24) are already pre-aligned and completely assembled so that the carrier (24) may be regarded in a sense as a "mounting-part" for every individually positioned optical part. It is thus only necessary to attach a carrier (24), prepared in such a way, to the, in the present case, openly accessible upper part of the stand (2), whereby the precise-stop-surfaces on the carrier (24) as well as in the inner space of the horizontal part of the upper part of the stand (2) ensure an exact positioning and mounting of each part (26–27) in regard to the entire system. The carrier (24) is linked with screws. Other equivalent linking-means are also conceivable, although a screwed linking has the advantage of a detachable connection, e.g., for purposes of reconfiguration in a change from one microscopic observation type to another.

Figure 4A:
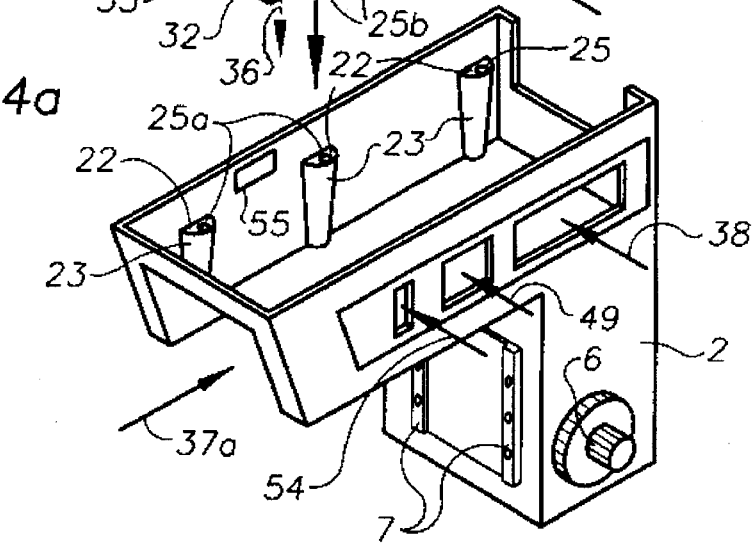
FIG. 4a: the upper part of a stand in perspective depiction.

The arrow (30) in FIG. 4b indicates the direction of incidence of an illumination beam. The component on carrier (24) represents an epi-illumination module. It is in optical connection to a fluorescence-divider turret (31), which contains four fluorescence-divider cubes (32–35), whereby the fluorescence-divider cube (34) is in operating position in the depicted version. It deflects the (30) incident light path in the direction of the arrow (36) vertically downwards in the direction of the not-depicted objective-turret, which, as can be seen in FIG. 4a, may be inserted as a slide-in module into that part of the horizontal area of the upper part of the stand (2), that faces the observer. This is indicated merely schematically by the depicted arrow (37a).

Figure 2A:
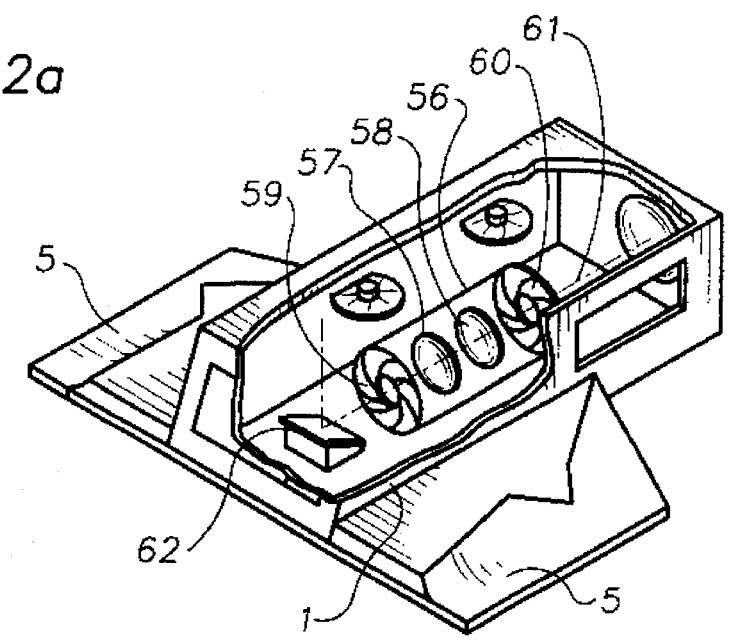
FIG. 2a: a stand-foot in perspective depiction, partially cut open.
Figure 2B:
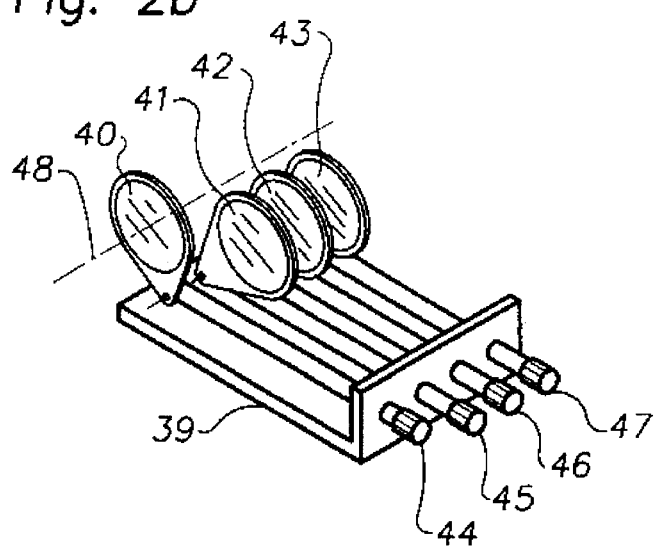
FIG. 2b: a slide-in filter-module in perspective depiction.

A filter module (39) may be inserted into the slide-in opening, marked by (38), in the familiar way, as shown in FIG. 2b. This module consists of e.g. four hinged filters (40–43), which may be brought consecutively into the path of rays, its optical axis in the area of the module (39), or the carrier (24) respectively, through correcting elements (44–47), which can be operated from outside. Because the positioning of filters in the optical illumination ray path is relatively alignment-uncritical, a highly precise sliding-guide is not necessary for the module (39).

Figure 4C:
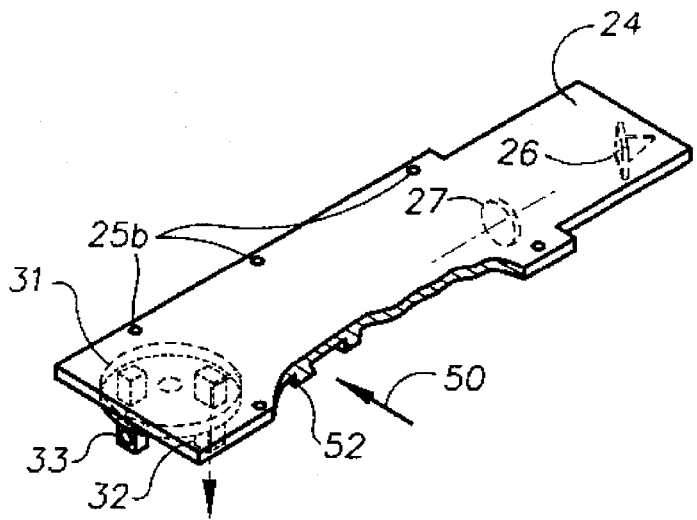
FIG. 4c: the carrier depicted in FIG. 4a with an additional dovetail-guide.

The second slide-in opening (49) in the horizontal part of the upper part of the stand (2) serves for the insertion of a not-depicted stop-module, compare the slide-in direction indicated by the arrows (50) in FIGS. 4b as well as 4c. The stop-module (51) is brought into operating position through a dovetail-guide, as can be seen in FIG. 4c. For this it is of great significance that the dovetail-guide is integrally connected with the carrier (24). This means that the precision guide is not installed in the frame-part of the slide-in opening (49) itself, but at the carrier (24), which can be positioned in exact alignment. The slide-in opening (49) itself as well as the already-mentioned slide-in opening (38) may therefore be manufactured relatively "imprecise", i.e. without complex detail-finishing and thus with expanded tolerance, because the required precision-positioning is only realized in the dovetail-guide (52) which is installed on the carrier (24). Thus the cumulative tolerances are reduced by one element because the slide-in opening (49) intended for a first module (2) can be manufactured with a reduced tolerance, whereas the carrier with its anyway in narrow tolerance produced precision-stop-surfaces requires only a correlative precision-treatment regarding its integrally articulated dovetail-guide. Since the goal of any manufacturing and service-friendly parts assembly of complex optical system equipment is a minimizing of cumulative-tolerances, significant cost and manufacturing advantages result from the by this invention proposed ways to slide-in and position the stop-module (51).

Figure 5:
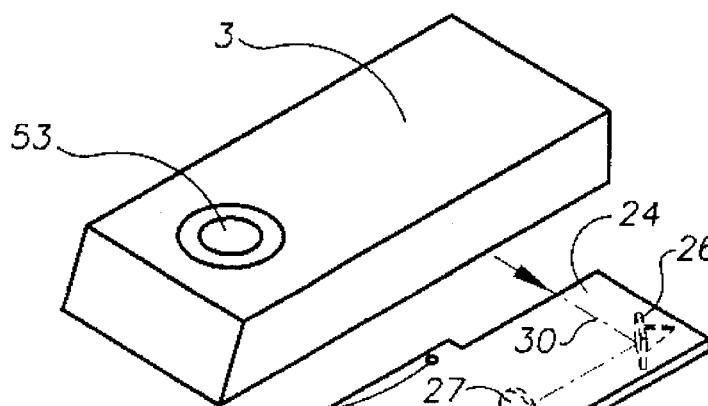
FIG. 5: an intermediate-module.

As FIGS. 4a and 4b in connection with FIG. 5 show, an intermediate-module (3) (FIG. 5) may be mounted after the insertion of the carrier (24) in the open upper part of the stand (2). It contains a tube lens (53) and has in its lower area as well as in its upper, the binocular-housing (4) facing area, corresponding, precisely produced stop and mounting surfaces. Other intermediate-modules, which contain e.g. besides the tube lens also a Bertrand lens or an enlargement changer or are designed as a polarizing-module, are—as a choice of the observer—also adaptable, without changing the eyepiece height for the observer. Further clearances (54) or (55) respectively in the side walls within the horizontal-area of the upper-part of the stand (2) are intended for the insertion of a polarizer or an analyzer respectively.

A pipe-shaped carrier (56) is located in the inner area of the stand-foot (1), as shown in FIG. 2a, in which lenses (57, 58) as well as a radiant field stop (59) and an aperture stop (60) are mounted as an already pre-made and pre-aligned unit. The pipe-shaped carrier (56) serves as a mounting and represents a module which can be positioned in exact alignment in the optical axis (61) of the illumination area through its housing protuberances with their precision-stop-surfaces proposed by this invention. The illumination beam, after leaving the radiant-field-stop (59), hits a surface-mirror (62), which is exactly positioned on two battered walls, which in turn have precision-stop-surfaces themselves. While the carrier (24), depicted in FIGS. 4b or 4c respectively, is designed essentially two-dimensional (plane), the carrier (56) is designed as a cylindrical three-dimensional pipe. Such special forms may require at least one holding element, which reaches at least partially around the cylindrical carrier in due form and has precision-stop-surfaces, too, which correspond to the already in the housing-modules present precision-stop-surfaces. Further details regarding this pipe-shaped carrier-mounting are described in a patent application with the title "microscope stand-foot," which has been filed at the same time.

The modular microscope system proposed by this invention makes it possible to attach, screw in, and to produce and assemble all required or by choice included housing-modules or under-modules or carriers respectively, on which pre-aligned and completely assembled individual parts or groups of parts are arranged, on the provided precision-stop-surfaces or attachment surfaces respectively, without additional alignment or optical adjustment expenditure. The upper part of the stand or the foot part respectively contain for this purpose mechanical, precisely-produced mounting surfaces for the mounting of these modules, as well as additional housing parts.

This results in the following overall advantages:

1. Adjustment mistakes or alignment inaccuracies are detected early, i.e., already in the individual module, not just in the final end-product.

2. A service-friendly parts-assembly is parallel possible.

3. The modularity of the entire system reaches a new step in quality: all construction groups are easily exchanged. This also allows for a reconfiguration from one illumination type to another with no changes to the ergonomical or conceptual overall concept. The filter module (39), e.g. may be inserted into the stand-foot (1) (see FIGS. 1b, 2a and 2b) or into the slide-in opening (38) in the upper part of the stand (2). The exact positioning of the carrier on the protuberances of the inner walls of the housing result by way of a "stilt" or a "pile-work" construction type, in a construction principle which is stable and free of interference-susceptibility, also under thermal considerations, because temperature influences have an especially negative impact in the area of construction of optical precision-equipment, since they lead to unwanted de-alignments and adulterations. An uncontrolled heat-flow to the carrier is impressively avoided through the material-saving construction design "on stacks." The proposed multi-point contact mounting or hinge respectively, avoids as a discontinuous mounting or translational direction-concept respectively disadvantages, which occur due to the system design in the continuous translational mechanism of the dovetail-type. The concept proposed by this invention finally leads to an ergonomical modular microscope system, in which a system-integrated up and down rating of modules or under-modules respectively can be done safely and is reproducible without accepting any other disadvantages.

PARTS LIST 1. stand-foot
2. upper part of the stand
3. intermediate-module
4. binocular-housing
5. tooth-rest
6. manual-operating-device
7. precision-guide
8. table-angle
9. microscope-table
10. mirror-housing
11/12. lamp-housing
13. housing module
14/15/16. truncated cone-shaped protuberances
17. wall-shaped housing-inner-space-divider
18–22. precision-stop-surfaces
23. elements shaped to the inner wall
24. carrier
25a. boreholes
25b. clearances
26. surface mirror
27–29. lenses
30, 36. arrows
31. fluorescence-divider turret
32–35. fluorescence-divider cube
37a. slide-in direction for objective-turret
37b. objective-turret
38. slide-in opening for filter-module (39)
39. filter-module
40–43. filter
4–47. correcting elements
48. optical axis
49. slide-in opening for stop-module
50. slide-in direction
51. stop-module
52. dovetail-guide
53. tube-lens
54. polarizing-slide-in opening
55. analyzer-opening
56. pipe-shaped carrier
57–58. lenses
59. radiant field-stop
60. aperture-stop
61. optical axis
62. surface-mirror

What is claimed is:

1. A modular microscope system comprising:

a stand-foot housing module;

an upper stand housing module having a vertical portion removably mounted on said stand-foot housing module and a horizontal portion extending from said vertical portion;

an intermediate housing module removably mounted on said horizontal portion of said upper stand housing module, said intermediate housing module having a binocular housing removably attached thereto;

each of said stand-foot housing module, said upper stand housing module, and said intermediate housing module having a plurality of inwardly pointing housing protuberances integrally formed therewith, each of said protuberances having at least one precision stop surface thereon;

a plurality of carriers removably mounted within said housing modules, each of said plurality of carriers having a plurality of component parts connected thereto in prealigned arrangement to form a functional unit;

each of said plurality of carriers including a plurality of precision stop surfaces for correspondence with said precision stop surfaces of said housing module within which said carrier is mounted to precisely position said carrier.

2. The modular microscope system according to claim 1, wherein said plurality of precision stop surfaces of a housing module includes at least one plane contact stop surface and at least one bearing stop surface.

3. The modular microscope system according to claim 1, wherein said plurality of precision stop surfaces of a housing module includes at least one point contact stop surface and at least one point bearing stop surface.

4. The modular microscope system according to claim 1, wherein at least one of said plurality of protuberances of a housing module includes a pair of precision stop surfaces lying in orthogonal planes.

5. The modular microscope according to claim 1, wherein at least one of said protuberances of a housing module is generally in the form of a cylinder.

6. The modular microscope according to claim 2, wherein at least one of said protuberances of a housing module is generally in the form of a truncated cone.

7. The modular microscope system according to claim 5, wherein said at least one protuberance extends downward from an inner ceiling wall of said housing module.

8. The modular microscope system according to claim 6, wherein said at least one protuberance extends downward from an inner ceiling wall of said housing module.

9. The modular microscope system according to claim 5, wherein said at least one protuberance extends upward from an inner floor wall of said housing module.

10. The modular microscope system according to claim 6, wherein said at least one protuberance extends upward from an inner ceiling wall of said housing module.

11. The modular microscope system according to claim 5, wherein said at least one protuberance extends axially in a vertical direction along an inner side wall of said housing module.

12. The modular microscope system according to claim 6, wherein said at least one protuberance extends axially in a vertical direction along an inner side wall of said housing module.

13. The modular microscope system according to claim 1, wherein at least one of said protuberances of a housing module is in the form of a wall-shaped inner-space divider.

14. The modular microscope system according to claim 13, wherein said wall-shaped inner space divider includes a bearing precision stop surface on an elevated portion thereof.

15. The modular microscope system according to claim 1, wherein said protuberances of a housing module include boreholes extending through precision stop surfaces thereof for receiving fasteners extending through clearances in corresponding precision stop surfaces of an associated carrier mounted within said housing module.

16. The modular microscope system according to claim 1, wherein at least one of said plurality of carriers is a flat plate.

17. The modular microscope system according to claim 1, wherein at least one of said plurality of carriers is a tube.

18. The modular microscope system according to claim 1, wherein at least one of said plurality of carriers is slidably received within an opening in said upper stand housing module and includes a plurality of consecutive filters individually selectively positionable on an optical axis.

19. The modular microscope system according to claim 1, wherein one of said plurality of carriers is mounted within said vertical portion of said upper stand housing module and includes a horizontally disposed table connected thereto for vertical travel.

20. The modular microscope system according to claim 1, wherein at least one of said plurality of carriers includes a turret containing a plurality of related optical elements for enabling selective positioning of one of said plurality of optical elements on an optical axis of said carrier.

21. The modular microscope system according to claim 20, wherein said related optical elements are beamsplitters.

22. The modular microscope system according to claim 20, wherein said related optical elements are objective lenses.

23. The modular microscope system according to claim 1, wherein a plurality of identically-sized intermediate housing modules are provided for interchangeable mounting on said horizontal portion of said upper stand housing module, each of said plurality of intermediate housing modules containing a different optical system therein.

24. The modular microscope system according to claim 23, wherein one of said plurality of intermediate housing modules contains a tube lens in combination with a Bertrand lens.

25. The modular microscope system according to claim 23, wherein one of said plurality of intermediate housing modules contains a zoom lens system.

26. The modular microscope system according to claim 23, wherein one of said plurality of intermediate housing modules contains a polarizing module.

* * * * *